United States Patent [19]

Cody et al.

[11] Patent Number: 5,162,600
[45] Date of Patent: Nov. 10, 1992

[54] METHOD OF TREATING LEAD CONTAMINATED SOIL

[75] Inventors: Charles A. Cody, Robbinsville; Steven J. Kemnetz, Trenton, both of N.J.; William Bronner, Brooklyn, N.Y.

[73] Assignee: Rheox, Inc., Hightstown, N.J.

[21] Appl. No.: 635,863

[22] Filed: Dec. 28, 1990

[51] Int. Cl.$^5$ .................. A62D 3/00; C05B 17/00; B09B 3/00
[52] U.S. Cl. .................. 588/236; 588/256; 71/33; 71/903; 106/811; 106/900; 405/128; 405/263; 423/659; 423/DIG. 20
[58] Field of Search .................. 106/811, 900, 468; 405/128, 129; 423/311, 92, DIG. 20, 659; 71/11

[56] References Cited

U.S. PATENT DOCUMENTS

| | | | |
|---|---|---|---|
| 3,375,063 | 3/1968 | Bookey et al. | 23/107 |
| 4,012,491 | 3/1977 | Hauge | 423/311 |
| 4,017,324 | 4/1977 | Eggers | 106/468 |
| 4,193,854 | 3/1980 | Drnevich et al. | 204/149 |
| 4,536,409 | 8/1985 | Otto, Sr. et al. | 423/15 |
| 4,601,832 | 7/1986 | Hooykaas | 210/717 |
| 4,623,469 | 11/1986 | Conner | 210/751 |
| 4,629,509 | 12/1986 | O'Hara et al. | 106/118 |
| 4,671,882 | 6/1987 | Douglas et al. | 210/720 |
| 4,687,373 | 8/1987 | Falk et al. | 405/128 |
| 4,710,219 | 12/1987 | Wahlberg, deceased et al. | 71/11 |
| 4,737,356 | 4/1988 | O'Hara et al. | 423/659 |
| 4,765,908 | 8/1988 | Monick et al. | 210/666 |
| 4,777,026 | 10/1988 | Griffith | 423/311 |
| 4,794,171 | 12/1988 | Tagaya et al. | 423/311 |
| 4,889,640 | 12/1989 | Stanforth | 210/751 |
| 4,950,409 | 8/1990 | Stanforth | 423/DIG. 20 |

FOREIGN PATENT DOCUMENTS 2144188 6/1990 Japan .................. 423/DIG. 20

OTHER PUBLICATIONS

*Van Nostrand's Scientific Encyclopedia*, Sixth Edition, pp. 1167–1171.

*Primary Examiner*—Gary P. Straub
*Attorney, Agent, or Firm*—Roper & Quigg

[57] ABSTRACT

A method of treating lead contaminated soil to reduce the amount of mobile lead contained in the soil, the method which comprises: (a) providing an agent selected from the group consisting of inorganic phosphate compounds, inorganic phosphite compounds and mixtures thereof; and (b) contacting the agent with the soil to react the agent with the lead and form immobilized, acid-insoluble lead compounds, thereby reducing the amount of mobile lead in the soil.

10 Claims, No Drawings

METHOD OF TREATING LEAD CONTAMINATED SOIL

BACKGROUND OF THE INVENTION

1. Field of the Invention

The present invention relates to a method of immobilizing heavy metal contaminants in soil, and particularly to a method of reducing the amount of leachable lead in contaminated soil to non-hazardous levels.

2. Brief Description of the Prior Art

The presence of heavy metal contaminants, such as lead, in soil poses a major environmental hazard, particularly when the lead is capable of leaching into ground water supplies as a result of rain or other influx of water at the contaminated site. Acid rain only complicates this problem by increasing the solubility, and hence mobility, of lead contaminants.

Due to a growing concern over heavy metal contaminants in the environment, the Environmental Protection Agency has adopted strict guidelines for the amount of leachable lead that can be extracted from soil samples. The Resource Conservation Recovery Act (RCRA) regulations require that wastes containing lead, chromium, cadmium, arsenic, mercury, selenium, silver or barium leach minimum concentrations of these metals to be legally defined as non-hazardous.

Currently, solid wastes are tested using the EP (Extraction Procedure) Toxicity Test contained in 40 C.F.R. Chapter 1, Part 261, Appendix II (1987), the disclosure of which is hereby incorporated by reference. The EP Toxicity Test determines whether a solid waste has unacceptable levels of hazardous substances which can be leached by infiltrating water. The test is designed to simulate a worst-case leaching situation. A liquid extract is prepared from a solid waste sample, and is analyzed to determine whether the waste is "EP Toxic." A new test, the Toxic Characteristics Leaching Procedure (TCLP) has been developed and proposed by the Environmental Protection Agency (EPA), but has not yet been adopted.

Industry efforts to date directed to reducing the mobility of heavy metals in wastes have generally focussed on pretreatment of the wastes before final disposal. For example, existing processes to reduce chemical mobility in liquid or semi-solid wastes involve mostly encapsulation processes, whereby various encapsulants are added to the waste to turn the waste into a solid. Examples of such encapsulants are cement and sodium silicate, asphalt, glass, and various polymers and chemicals. These prior art encapsulation techniques attempt to isolate the contaminant by creating a hard solid mass which water cannot penetrate. Encapsulation processes are frequently used as final wastewater treatment steps to render sludges and liquids non-leachable. Unfortunately, encapsulation processes tend to be expensive and often greatly increase the volume of material requiring final disposal. Moreover, the encapsulated hazardous waste may be subject to leaching if the encapsulation seal subsequently fails.

Another prior art method for treating an aqueous waste containing heavy metals, such as lead, is disclosed by DOUGLAS et al., in U.S. Pat. No. 4,671,882, wherein a non-hazardous sludge is said to be produced by (a) adding phosphoric acid or an acid phosphate salt to the aqueous solution to precipitate the heavy metals; (b) lowering the pH of the solution to less than about 5.0; (c) adding a coagulant to the solution; (d) raising the pH of the solution to about 7.0 by the addition of a calcium source; and (e) dewatering the resulting non-hazardous sludge. Phosphoric acid is said to be preferred over acid phosphate salts (mono- or dihydrogen ammonium phosphate). Treatment with phosphoric acid or an acid phosphate salt precipitates the heavy metal and forms metal phosphates which are said to be much more insoluble than the corresponding metal hydroxides or sulfates.

Various attempts have also been made to pretreat solid wastes containing heavy metal contaminants. For example, O'HARA et al., U.S. Pat. No. 4,737,356, discloses a process for immobilizing lead and cadmium in solid wastes which involves the addition of a water-soluble phosphate, particularly phosphoric acid. The solids treated in accordance with the O'HARA et al. '356 patent include solid residues resulting from the burning of solid wastes. These solids are generally said to consist of fly ash, in whole or in part, since lead and cadmium tend to be concentrated in fly ash. The amount of water-soluble phosphate employed is said to depend on the alkalinity of the solid residue, its buffering capacity, and the amounts of lead and cadmium present. In general, from about 1 to 8% by weight of phosphoric acid is employed, together with a calcium hydroxide-providing composition such as lime, hydrated lime or flue gas scrubber product. O'HARA et al. teach that calcium phosphate, $Ca_3(PO_4)_2$, is inoperative in immobilizing lead and cadmium. See column 3, lines 3-6 and Example 11 of O'HARA et al. '356.

O'HARA et al., U.S. Pat. No. 4,629,509, is directed to a process in which cadmium and lead are immobilized in a dry solid residue, i.e. fly ash, by mixing equimolar proportions of lime and an aqueous solution of a soluble inorganic salt supplying sulfide. The use of calcium sulfide is said to eliminate the necessity of adding lime in order to immobilize the cadmium or lead contaminant.

STANFORTH, U.S. Pat. No. 4,950,409, is directed to a method of treating solid hazardous wastes containing unacceptable levels of leachable metals such as lead and cadmium. The solid waste is mixed with lime and an agent selected from carbon dioxide and bicarbonate. Reaction between the metals and agent is said to convert the metals to non-leachable forms which are relatively stable under normal environmental conditions.

Similarly, STANFORTH, U.S. Pat. No. 4,889,640, discloses a method of treating solid hazardous wastes containing unacceptable levels of leachable metals such as lead, in which the solid waste is mixed with a water treatment lime sludge which includes an agent selected from calcium carbonate, magnesium carbonate and calcium magnesium carbonate. The agent and the metal are said to convert the metal to a non-leachable form which is relatively stable under normal conditions.

The above-described efforts, while providing potential means for pretreating concentrated hazardous wastes prior to ultimate disposal, fail to provide a viable method of treating existing hazardous waste sites that contain large volumes of soil contaminated with untreated heavy metals.

It would therefore be highly desirable to provide a method for effectively immobilizing heavy metal pollutants such as lead in soil located at a hazardous waste site. Such a treatment technique would ideally be suitable for application to large volumes of earthen material, utilize economical and environmentally safe treating agents, and be adapted for implementation outdoors.

SUMMARY OF THE INVENTION

The present invention provides a method of treating lead contaminated soil to reduce the amount of mobile lead contained in said soil, the method which comprises:

(a) providing an agent selected from the group consisting of calcium, zinc, magnesium or ammonium phosphate compounds, calcium, zinc, magnesium or ammonium phosphite compounds and mixtures thereof; and (b) contacting the agent with soil to react the agent with the mobile lead contained in the soil and form immobilized, water-insoluble lead compounds, thereby reducing the amount of mobile lead in said soil.

In a preferred aspect of the invention, the calcium, zinc, magnesium or ammonium phosphate compounds are selected from the group consisting of calcium orthophosphate, magnesium orthophosphate, zinc orthophosphate, hydroxyapatite, calcium phosphate monobasic, ammonium phosphate monobasic, ammonium phosphate hemibasic, calcium chloride fluoride orthophosphate, calcium glycerophosphate, calcium metaphosphate, dicalcium orthophosphate, dimagnesium orthophosphate, monocalcium orthophosphate, calcium pyrophosphate, magnesium pyrophosphate, zinc pyrophosphate, calcium pyrophosphate pentahydrate, tricalcium diorthophosphate, magnesium phosphate dibasic or tribasic, and mixtures thereof. Especially preferred sources of calcium phosphate treating compounds include phosphate rock, as well as fertilizers such as triple superphosphate and superphosphate.

Suitable phosphite compounds which have been found to function effectively in accordance with the instant invention include ammonium phosphite, dicalcium orthophosphite, calcium hypophosphite, magnesium phosphite, zinc phosphite and mixtures thereof.

The agents used in the inventive system are lead stabilizing compositions and may include a buffering agent, such as hectorite gangue, carbonates, dolomite or mixtures thereof. In addition, the lead stabilizing compositions may include clay capable of exchanging cations and/or an ammoniating agent for the phosphates and phosphites.

The method of the invention may be carried out by simply spreading the agent, i.e., the lead immobilizing composition, over the contaminated soil sample. Optionally, the lead immobilizing composition may be plowed or disked into the soil to promote mixing.

Unlike prior art techniques, the method of the invention is suitable for treating large volumes of earthen material at outdoor hazardous waste sites. Moreover, the technique of the present invention advantageously utilizes economical and environmentally safe treating agents. Treatment of a lead contaminated soil in accordance with the invention reduces the amount of mobile or leachable lead contained in the soil to EPA-acceptable levels, such that the soil may be classified as "nonhazardous."

DETAILED DESCRIPTION OF THE INVENTION

As indicated above, the present invention is directed to a method of treating mobile lead contaminated soil to reduce the amount of mobile lead contained in said soil, the method which comprises:

(a) providing an agent selected from the group consisting of calcium, zinc, magnesium or ammonium phosphate compounds, calcium, zinc, magnesium or ammonium phosphite compounds and mixtures thereof; and (b) contacting said agent with said soil to react said agent with said lead and form immobilized, water-insoluble lead compounds, thereby reducing the amount of mobile lead in said soil.

The term "mobile" used herein refers to the movability of the lead compounds in the soil due to natural environmental conditions such as erosion, solubilization by rainfall causing movement in the soil by leaching or otherwise.

Useful inorganic phosphate compounds include those selected from the group consisting of calcium orthophosphate, magnesium orthophosphate, zinc orthophosphate, hydroxyapatite, calcium phosphate monobasic, ammonium phosphate monobasic, ammonium phosphate hemibasic, calcium chloride fluoride orthophosphate, calcium glycerophosphate, calcium metaphosphate, dicalcium orthophosphate, dimagnesium orthophosphate, monocalcium orthophosphate, calcium pyrophosphate, magnesium pyrophosphate, zinc pyrophosphate, calcium pyrophosphate pentahydrate, tricalcium diorthophosphate, magnesium phosphate dibasic or tribasic, and mixtures thereof. Other inorganic phosphate compounds known in the art may be utilized as the agent in accordance with the present invention provided they achieve the desired lead immobilization as required by this invention.

Suitable inorganic phosphite compounds include ammonium phosphite, dicalcium orthophosphite, calcium hypophosphite, magnesium phosphite, zinc phosphite and mixtures thereof. The agent may comprise other inorganic phosphite compounds known in the art provided they achieve the desired lead immobilization as required by this invention.

Preferably, the inorganic phosphate or phosphite agent is provided in the form of a fertilizer. Particularly useful fertilizers which may be employed in accordance with the instant invention include triple superphosphate and superphosphate. Other calcium phosphate or phosphite fertilizers known in the art may also be employed.

Triple superphosphate is a dry, granular, free-flowing fertilizer produced by the addition of phosphoric acid to phosphate rock. Triple superphosphate is commercially available and provides about 40-48% $P_2O_5$, approximately three times the amount of available phosphate provided by superphosphate. In view of the higher available phosphate, triple superphosphate is preferred over superphosphate in the treating process of the present invention. Triple phosphate fertilizers may also be ammoniated to increase their solubility.

Superphosphate is a significant commercial fertilizer prepared by the action of sulfuric acid on insoluble phosphate rock to form a mixture of gypsum and calcium phosphate, monobasic. A typical superphosphate composition consists of 30% $CaH_4(PO_4)_2.H_2O$; 10% $CaHPO_4$; 45% $CaSO_4$; 10% iron oxide, alumina, silica; and 5% water.

Advantageously, triple superphosphate or superphosphate fertilizers may be employed in their commercial forms without modification in accordance with the present invention. Moreover, these fertilizers are economical, environmentally safe, and suitable for treatment of large volumes of contaminated soil.

Phosphate rock is an alternative treating agent which may be used according to the present invention. A naturally occurring rock consisting largely of calcium phosphate, phosphate rock is used to prepare triple superphosphate and superphosphate. Since phosphate rock is a natural rock, its use as an agent in accordance with the instant invention has the advantage of not creating any adverse side effects on the treated soil When an acidic soil is treated with phosphate rock, phosphate ions become available to react with lead in the soil, thereby forming insoluble lead phosphate compounds (such as lead orthophosphate) which have a greatly reduced mobility. Accordingly, in regions where acid rain is prevalent, phosphate rock may be employed as the sole agent, or may be used in combination with the commercial fertilizers described above.

In general, the agent may be loaded into the soil in an amount by weight of from about 1 to about 60%, based on the total weight of the soil being treated. As indicated in the example below, however, even small percentages of the lead stabilizign compositon are effective in substantially reducing the amount of leachable lead in the contaminated soil.

In addition to the calcium phosphate or phosphite treating agent, the agents of the invention may include one or more additional stabilizing agents. Various buffering agents known in the art have been found to be especially useful as supplemental treating agents; these buffering agents control the amount of leachable lead by buffering the acidity of the soil sample. Particularly useful buffering agents include those selected from the group consisting of hectorite gangue, carbonates, dolomite and mixtures thereof. Hectorite gangue is mostly calcite and dolomite, and inexpensive enough to constitute a viable treating agent despite its reduced efficacy in comparison to calcium phosphate fertilizers.

Another gorup of supplemental treating agents which may be used with the method of the invention include clays capable of ion exchanging cations on their surfaces, as for example, clays selected from the group consisting of $H^+$ bentonite, calcium bentonite, sodium bentonite, $H^+$ hectorite, calcium hectorite, sodium hectorite, crude hectorite, crude bentonite and mixtures thereof.

Loading of the agent into the soil to be treated may be conveniently performed by simply spreading the composition over the surface of the contaminated site. Over time, and assisted by the action of rainfall, the agent or its by-products migrate downward through the soil, immobilizing the lead contaminants in the soil.

Alternatively, the agent may be broadcast or spread over the surface of the site, and subsequently plowed in or disked to effect mixing. Conventional machinery known to those skilled in the art, may conveniently be employed for spreading and/or plowing in the agent.

As will be evident from the example set forth below, treatment of a lead contaminated soil in accordance with the invention effectively immobilizes most of the lead pollutants in the soil. The amount of leachable lead contained in the soil may be reduced to EPA-acceptable levels (<5 ppm). For example, a soil sample contaminated with approximately 100 ppm of leachable lead may be treated according to the invention such that the amount of leachable lead is reduced to 0.5 ppm or less.

The following example is given to illustrate the invention but is not deemed to be limiting thereof. All percentages given are based on 100% of the total weight of the soil unless otherwise specified.

EXAMPLE

Treatment of Lead Contaminated Soil

The following experimental runs illustrate the treatment of lead contaminated soil according to the process of the present invention. Three mechanisms of lead stabilization were explored, based on: (1) retarding movement of lead (Pb) via pH control; (2) trapping lead as an acid-insoluble chemical complex; and/or (3) trapping lead onto an ion exchanging clay.

Soil samples containing lead contaminants were treated with the reagents listed in Table I below. After treatment, the soil samples were tested according to the EP Toxicity Test described above to assess the efficacy of the various lead stabilizing compositions in immobilizing the lead pollutants.

TABLE I

LEACHABLE LEAD FROM SOIL

| Lead Stabilizing Composition | % Loading, Wt. | Leachable Pb, ppm |
|---|---|---|
| Control (as is soil) | — | 94, 92, 92 |
| pH Control | | |
| Hectorite Gangue | 50 | 32 |
| $H_3PO_4$ | 5 | 0.40 |
| $H_3PO_3$ | 5 | 2.73 |
| Tartaric Acid | 5 | 94 |
| Oxalic Acid | 5 | 51 |
| Insoluble Complex | | |
| Na Stearate | 5 | 38 |
| $CaHPO_3$ | 50 | 7.94 |
| Na Tartrate | 10 | 116 |
| Hydroxyapatite | 50 | 0.5 |
| Hydroxyapatite | 50 | 0.2 |
| Hydroxyapatite | 40 | 0.64 |
| Hydroxyapatite | 30 | 1.28 |
| Hydroxyapatite | 20 | 2.65 |
| Hydroxyapatite | 10 | 6.32 |
| Ion Exchange Clay | | |
| $H^+$ Bentonite | 5 | 66 |
| $H^+$ Hectorite | 5 | 72 |
| Crude Hectorite | 50 | 32 |
| Crude Bentonite | 50 | 39 |
| pH & Ion Exchanging | | |
| Control, "as is" Soil | 0 | 146* |
| Crude Hectorite/Gangue | 25/25 | 36 |
| Triple Superphosphate | 50 | <0.2 |
| Triple Superphosphate | 40 | <0.2 |
| Triple Superphosphate | 30 | <0.2 |
| Triple Superphosphate | 20 | <0.2 |
| Triple Superphosphate | 10 | <0.2 |
| Triple Superphosphate | 5 | <0.2 |
| Triple Superphosphate | 1 | 3.27 |
| Triple Superphosphate/Hectorite Gangue | 2.5, 2.5 | 4.9 |
| Triple Superphosphate/Hectorite Gangue | 5, 5 | 0.7 |

*Determined by proposed TCLP method

Based on the foregoing, it is apparent that treatment based solely on pH control is limited in its potential. The hectorite gangue sample is mostly calicte and dolomite, however, and is therefore inexpensive enough to function as a useful supplemental treating agent when used in combination with other agents, despite its low efficiency. The tartaric acid was ineffective whereas oxalic acid was considered too toxic to be practical. The phosphate ion chemistry was found to function via insoluble complex ion formation. Although phosphoric acid was partially effective in immobilizing leachable lead in the treated soil samples, this reagent is completely unacceptable for treatment of large volumes of soil at an outdoor hazardous waste site. Specifically, phosphoric acid, being a liquid, is impractical to spread over the surface of a contaminated site. Any attempt to spray phosphoric acid over a site will result in formation of an acid mist in the air. Such an acid mist poses a great danger of inflicting serious eye and/or skin injuries to those carrying out the treatment or any other idnividuals in the vicinity of the treatment operation. A phosphoric acid mist will also result in corrosion of metal or painted surfaces that are contacted by the acid.

Under the heading Insoluble Complex in Table I, it is evident that hydroxyapatite greatly suppressed the leachable lead even at loadings as low as 10% by weight. $CaHPO_3$ was not nearly as effective, requiring 50% loading to achieve a reduction in Pb from 94 ppm to 7.94 ppm.

The idea of employing an ion exchanging clay trap can be seen to be somewhat justified by the results in Table I; both crude hectorite and crude bentonite slightly lowered the leachable Pb content after adjustment for dilution (94/2=47 ppm vs. 32/39, respectively). It must be kept in mind, however, that these raw materials have extremely low cost which would tend to offset their slight effectiveness.

The triple superphosphate material employed in this example was a commercially available (Hoffman) triple superphosphate fertilizer. Analysis by X-ray diffraction and infrared spectroscopy indicated that the bulk of the triple superphosphate was calcium orthophosphate with a small amount of $NH_4CaHP_2O_7$ being present. Leach testing of the fertilizer in distilled water indicated a solubility of approximately g/100 ml of water.

As indicated above, triple superphosphate provided superior lead stabilization results, and reduced the level of hazardous leachable lead to less than 5 ppm. It is believed that treatment with triple superphosphate fertilizer resulted in formation of acid-insoluble lead orthophosphate, $Pb_3(PO_4)_2$.

The 5/5 mix of triple superphosphate with hectorite gangue was also seen to be highly effective in suppressing leachable lead.

The invention being thus described, it will be obvious that the same may be varied in many ways. Such variations are not to be regarded as a departure from the spirit and scope of the invention and all such modifications are intended to be included within the scope of the following claims.

What is claimed is:

1. A method of treating lead contaminated soil to reduce the amount of mobile lead contained in said soil, the method which comprises:
   (a) providing an agent consisting essentially of calcium orthophosphate;
   (b) contacting said agent with said soil to react said agent with mobile lead contained in the soil and form immobilized, water-insoluble lead compounds.

2. The method of claim 1, wherein said calcium orthophosphate is provided by phosphate rock.

3. The method of claim 1, wherein said agent is loaded into said soil in an amount of from about 1 to about 60% by weight, based on the total weight of said soil.

4. The method of claim 1, wherein the contacting step is carried out by spreading the agent over the surface of the lead contaminated soil.

5. The method of claim 14, wherein the agent is plowed in or disked into the soil to mix the agent with said soil.

6. The method of claim 1, wherein the amount of leachable lead in the soil is reduced to non-hazardous levels.

7. The method of claim wherein the amount of leachable lead in the soil is reduced to about 5 ppm or less.

8. A method of treating lead contaminated soil to reduce the amount of mobile lead contained in said soil, the method which comprises:
   (a) providing an agent selected from the group consisting of phosphate rock, hydroxyapatite and mixtures thereof; and
   (b) contacting said agent with the soil in an amount of from about 1 to about 60% by weight, based on the total weight of said soil, to react said agent with said lead and form immobilized, water-insoluble lead phosphate compounds.

9. A method of treating lead contaminated soil to reduce the amount of mobile lead contained in said soil, the method which comprises:
   (a) providing an agent consisting essentially of a mixture of (i) calcium orthophosphate, (ii) a buffering agent, (iii) an ammoniating agent, and (iv) an ion exchanging clay selected from the group consisting of $H^+$ bentonite, calcium bentonite, sodium bentonite, crude bentonite and mixtures thereof; and
   (b) contacting said agent with said soil to react said agent with mobile lead contained in the soil and form immobilized, water-insoluble lead compounds.

10. The method of claim 9, wherein said buffering agent is selected from the group consisting of carbonates, dolomite and mixtures thereof.

* * * * *

UNITED STATES PATENT AND TRADEMARK OFFICE
CERTIFICATE OF CORRECTION

PATENT NO. : 5,162,600

DATED : November 10, 1992

INVENTOR(S) : C. A. Cody et al.

It is certified that error appears in the above-identified patent and that said Letters Patent is hereby corrected as shown below:

Column 8, line 12, change "14" to --4--.

Column 8, line 18, after "claim", insert --1--.

Signed and Sealed this

Twelfth Day of October, 1993

Attest:

BRUCE LEHMAN

Attesting Officer    Commissioner of Patents and Trademarks